United States Patent
Yoon

(10) Patent No.: US 10,416,445 B1
(45) Date of Patent: Sep. 17, 2019

(54) LENSES WITH CONSISTENT DISTORTION PROFILE

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/413,294

(22) Filed: May 15, 2019

Related U.S. Application Data

(63) Continuation of application No. 15/727,799, filed on Oct. 9, 2017.

(51) Int. Cl.
| | |
|---|---|
| *G02B 27/00* | (2006.01) |
| *G06T 5/00* | (2006.01) |
| *G02B 3/08* | (2006.01) |
| *G06F 3/01* | (2006.01) |

(52) U.S. Cl.
CPC ........... *G02B 27/0025* (2013.01); *G02B 3/08* (2013.01); *G06T 5/006* (2013.01); *G06F 3/013* (2013.01)

(58) Field of Classification Search
None
See application file for complete search history.

(56) References Cited

U.S. PATENT DOCUMENTS

2017/0336539 A1    11/2017   Perreault et al.

OTHER PUBLICATIONS

Yoon, Office Action, U.S. Appl. No. 15/727,799, dated Nov. 13, 2018, 8 pgs.
Yoon, Notice of Allowance, U.S. Appl. No. 15/727,799, dated Feb. 26, 2019, 5 pgs.

*Primary Examiner* — Robin J Mishler
(74) *Attorney, Agent, or Firm* — Morgan, Lewis & Bockius LLP

(57) ABSTRACT

A head-mounted display device includes a display and a lens that provides consistent distortion independent of a rotational position of a wearer's eye. The lens includes an optically transparent substrate and is separate from the display. The lens is configured to focus light from a first location of the display on a pupil of the eye in a first rotational position and focus light from a second location of the display on the pupil of the eye in a second rotational position. The light from the first location of the display to the pupil of the eye in the first rotational position and the light from the second location of the display to the pupil of the eye in the second rotational position have a same optical path length.

20 Claims, 7 Drawing Sheets

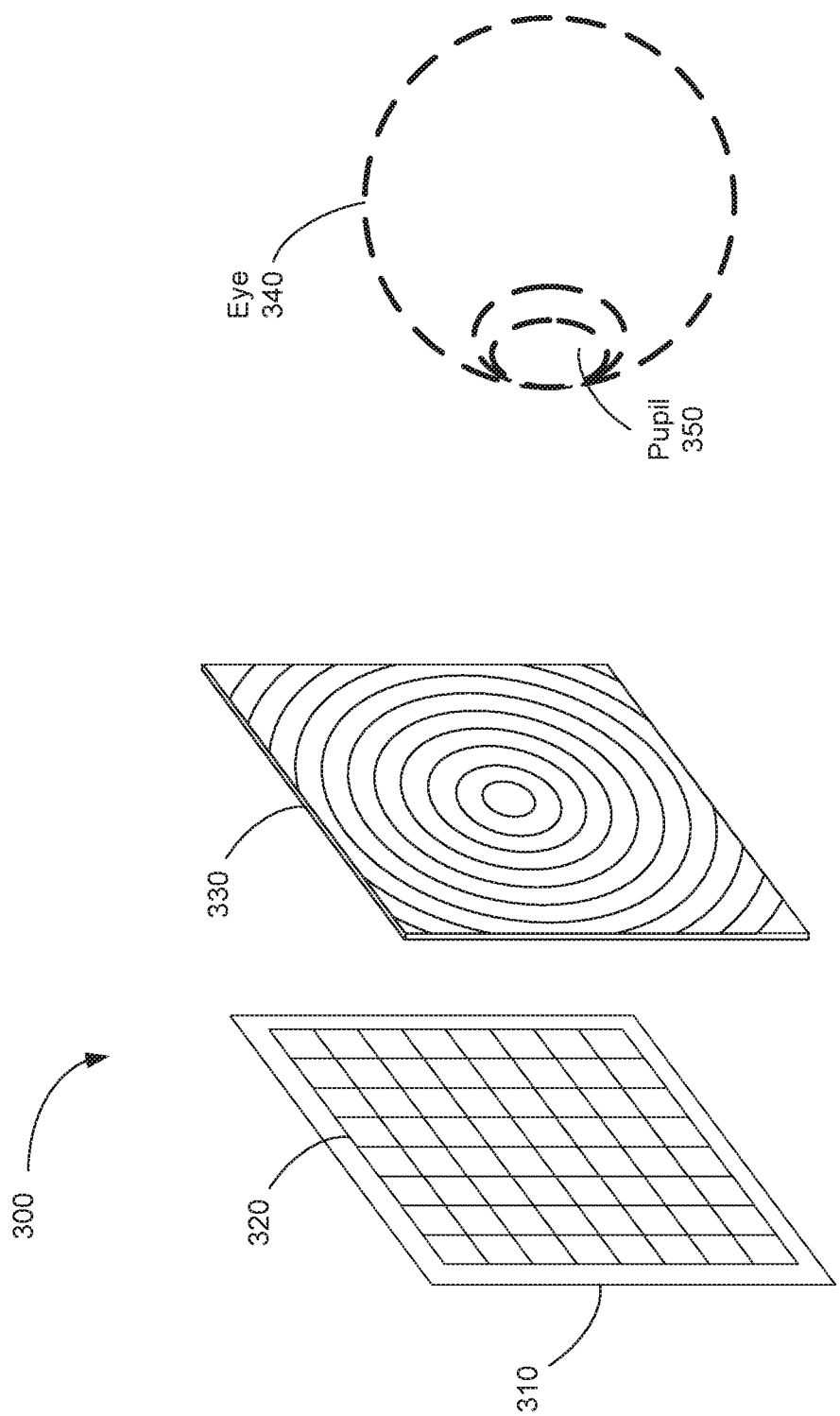

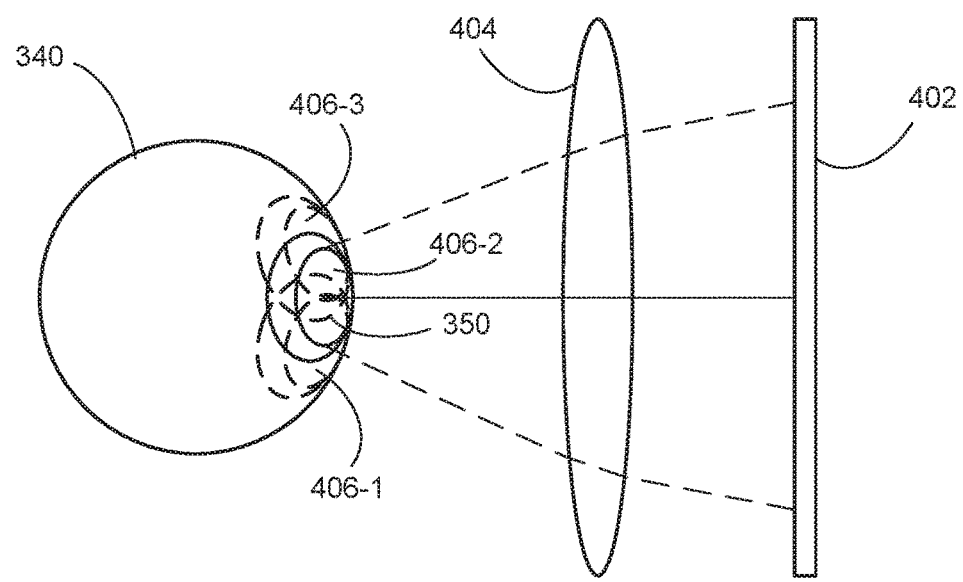
Figure 4A
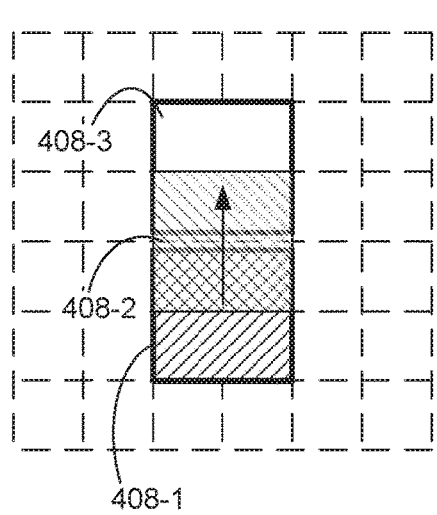 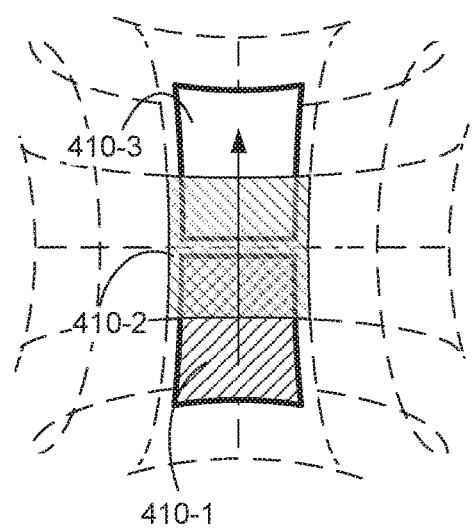
Figure 4B

LENSES WITH CONSISTENT DISTORTION PROFILE

RELATED APPLICATION

This is a continuation application of U.S. patent application Ser. No. 15/727,799, entitled "Lenses with Consistent Distortion Profile," filed Oct. 9, 2017, which is incorporated by reference herein in its entirety.

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. Head-mounted display devices typically include a plurality of lenses. However, when a user sees an image through a conventional lens, the conventional lens causes different distortions depending on a rotational position of an eye of the user. This reduces the user satisfaction with the head-mounted display device.

SUMMARY

Accordingly, there is a need for lenses that provide consistent distortions independent of a rotational position of an eye of a user.

The above deficiencies and other problems associated with conventional lenses are reduced or eliminated by the disclosed lenses. In some embodiments, the disclosed lenses are included in a display device. In some embodiments, the device is a head-mounted display device. In some embodiments, the device is portable.

In accordance with some embodiments, a head-mounted display device includes a display; and a lens that includes an optically transparent substrate having a first lens surface and a second lens surface that is opposite to the first lens surface. The lens is separate from the display. The first lens surface includes a convex surface without Fresnel structures. The second lens surface is defined by a convex base curvature and a plurality of Fresnel structures. The lens is configured to focus light from a first location of the display on a pupil of an eye of a wearer in a first rotational position at a first time and focus light from a second location, distinct from the first location, of the display on the pupil of the eye of the wearer in a second rotational position that is distinct from the first rotational position at a second time that is distinct from the first time. The light from the first location of the display to the pupil of the eye of the wearer in the first rotational position and the light from the second location of the display to the pupil of the eye of the wearer in the second rotational position have a same optical path length. In some embodiments, the device includes one or more processors configured to adjust an image displayed on the display using a particular mapping function independent of whether the pupil of the eye of the wearer is in the first rotational position or the second rotational position.

In accordance with some embodiments, a lens includes an optically transparent substrate having a first lens surface and a second lens surface that is opposite to the first lens surface. The first lens surface includes a convex surface without Fresnel structures. The second lens surface is defined by a convex base curvature and a plurality of Fresnel structures. The lens is configured to focus light from a first location of a display that is separate from the lens on a pupil of an eye of a wearer in a first rotational position at a first time and focus light from a second location, distinct from the first location, of the display on the pupil of the eye of the wearer in a second rotational position that is distinct from the first rotational position at a second time that is distinct from the first time. The light from the first location of the display to the pupil of the eye of the wearer in the first rotational position and the light from the second location of the display to the pupil of the eye of the wearer in the second rotational position have a same optical path length.

In accordance with some embodiments, a method includes focusing light from a first location of a display on a pupil of an eye of a wearer in a first rotational position at a first time with a lens that includes an optically transparent substrate having a first lens surface and a second lens surface that is opposite to the first lens surface. The lens is separate from the display. The first lens surface includes a convex surface without Fresnel structures. The second lens surface is defined by a convex base curvature and a plurality of Fresnel structures. The method also includes focusing light from a second location, distinct from the first location, of the display on the pupil of the eye of the wearer in a second rotational position that is distinct from the first rotational position at a second time that is distinct from the first time with the lens. The light from the first location of the display to the pupil of the eye of the wearer in the first rotational position and the light from the second location of the display to the pupil of the eye of the wearer in the second rotational position have a same optical path length. In some embodiments, the method includes adjusting an image displayed on the display using a particular mapping function independent of whether the pupil of the eye of the wearer is in the first rotational position or the second rotational position.

Thus, the disclosed embodiments provide compact and light lenses and lens assemblies that provide high quality images, and methods of making such lenses and lens assemblies.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4A is a schematic diagram illustrating a display device in accordance with some embodiments.

FIG. 4B illustrate displayed objects and projected objects in accordance with some embodiments.

Figure 1:
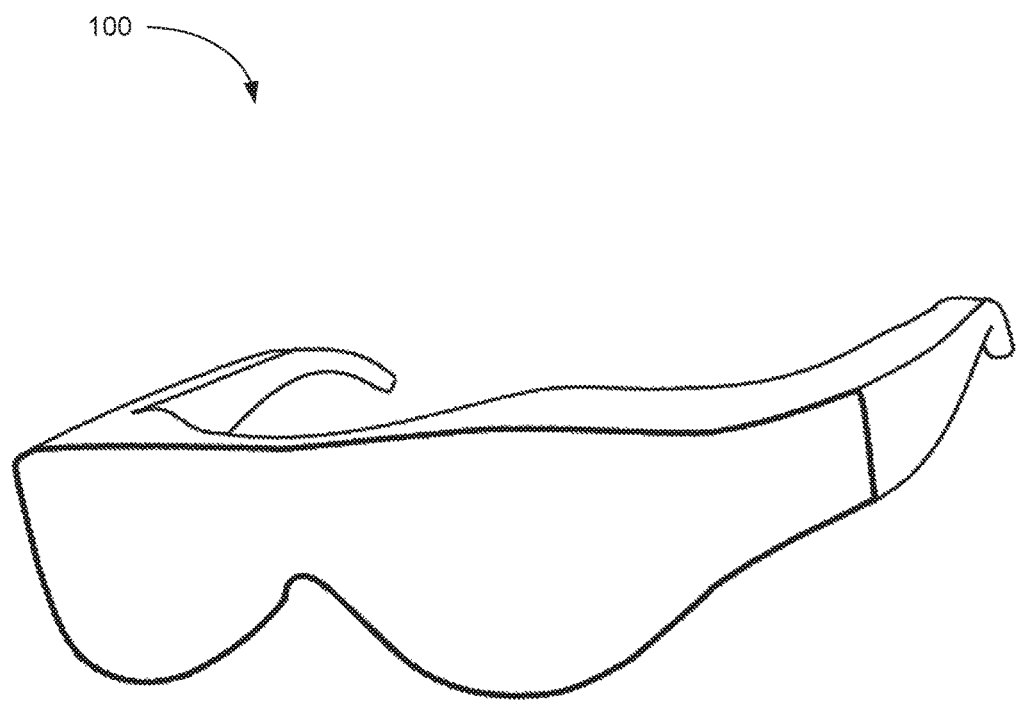
FIG. 1 is a perspective view of a display device in accordance with some embodiments.

These figures are not drawn to scale unless indicated otherwise.

DETAILED DESCRIPTION

Conventional head-mounted displays often include a complex set of optics.

Fresnel lenses, having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from an effect called "pupil swim." "Pupil swim" describes changes in distortion caused by a lens when an object is viewed through different portions of the lens.

The disclosed embodiments include lenses that provide a consistent distortion profile (e.g., the distortion profile remains consistent regardless of the portions of the lens through which an object is viewed).

The disclosed embodiments also provide head-mounted display devices that include the above-described lenses and methods for projecting an image using the above-described lenses.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first location could be termed a second location, and, similarly, a second location could be termed a first location, without departing from the scope of the various described embodiments. The first location and the second location are both locations, but they are not the same locations.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
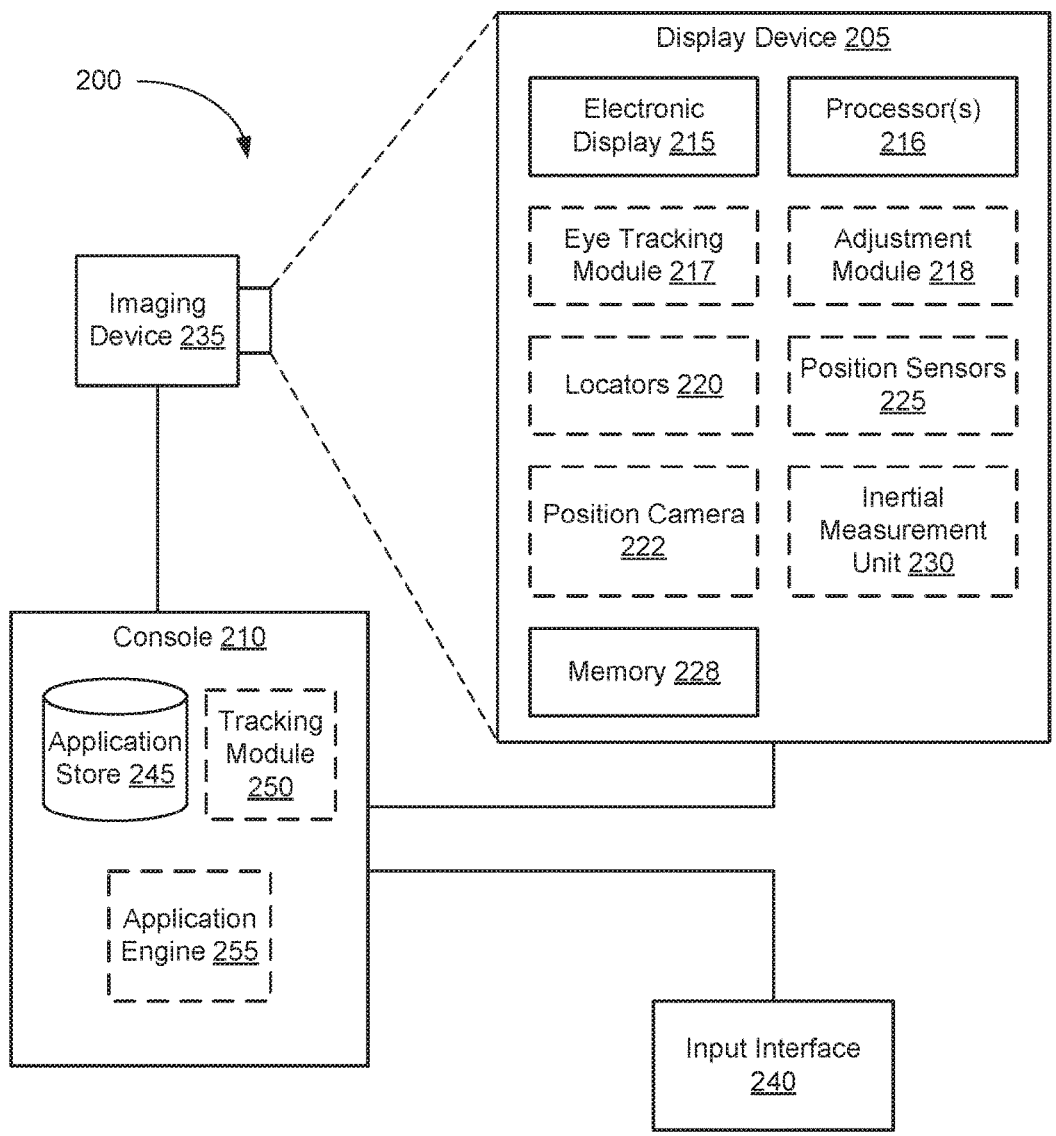
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof. In some embodiments, adjustment module 218 modifies an object using a particular mapping function (e.g., a distortion function) to compensate for the distortion associated with the display optics (e.g., lenses).

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330 (e.g., a hybrid Fresnel lens or a lens assembly). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330 (e.g., a hybrid Fresnel lens or a lens assembly).

In some embodiments, display device 300 uses the emission intensity array to facilitate providing image light to a location of pupil 350 of eye 340 of a user, and minimize the amount of image light provided to other areas in the eyebox.

One or more lenses 330 (e.g., a hybrid Fresnel lens or a lens assembly) receive the modified image light (e.g., attenuated light) from the emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 (e.g., a hybrid Fresnel lens or a lens assembly) toward the determined location of pupil 350, and not toward other locations in the eyebox.

FIG. 4A is a schematic diagram illustrating a display device in accordance with some embodiments.

The display device, shown in FIG. 4A, includes display 402 and lens 404. Lens 404 in FIG. 4A is a conventional convex-convex lens.

FIG. 4A also illustrates the rotation of eye 340 of a wearer (which is not part of the display device) into three different rotational positions. While eye 340 is in a first rotational position, pupil 350 is at first location 406-1. While eye 340 is in a second rotational position, pupil 350 is at second location 406-2. While eye 340 is in a third rotational position, pupil 350 is at third location 406-3.

As eye 340 rotates from the first rotational position to the second rotational position, images from different portions of display 402 are projected onto pupil 350 of eye 340 through different portions of lens 404. When lens 404 is a conventional convex-convex lens, this changes the distortion caused by lens 404, which is described further with respect to FIG. 4B.

FIG. 4B illustrate displayed objects and projected objects in accordance with some embodiments.

The left side of FIG. 4B illustrates an object moving on display 402. The object moves from position 408-1 to position 408-2, followed by a movement from position 408-2 to position 408-3. In some embodiments, when the object is located at position 408-1 of display 402, eye 340 is in the first rotational position; when the object is located at position 408-2 of display 402, eye 340 is in the second rotational position; and when the object is located at position 408-3 of display 402, eye 340 is in the third rotational position (as the object moves from position 408-1 to position 408-2, and then to position 408-3, eye 340 rotates from the first rotational position to the second rotational position, and then to the third rotational position, which leads to the movement of pupil 350 of eye 340 from first location 406-1 to second location 406-2, then to third location 406-3).

The right side of FIG. 4B illustrates corresponding images of the object projected to eye 340. In FIG. 4B, the projected images show a pincushion distortion. Alternatively, the projected images may show a barrel distortion.

When eye 340 is receiving a projection of the object in position 408-1, the object is projected through a first portion of lens 404. The projection of the object through the first portion of lens 404 has a first distortion. When eye 340 is receiving a projection of the object in position 408-2, the object is projected through a second portion of lens 404, which is distinct from the first portion of lens 404. The projection of the object through the second portion of lens 404 has a second distortion that is distinct from the first distortion (e.g., the first distortion has a first degree of distortion and the second distortion has a second degree of distortion that is distinct from the first degree of distortion, such as the first distortion being greater than the second distortion or the first distortion being less than the second distortion). When eye 340 is receiving a projection of the object in position 408-3, the object is projected through a third portion of lens 404, which is distinct from the first portion and the second portion of lens 404. The projection of the object through the third portion of lens 404 has a third distortion that is distinct from the second distortion (e.g., the second distortion has a second degree of distortion and the third distortion has a third degree of distortion that is distinct from the second degree of distortion, such as the third distortion being greater than the second distortion or the third distortion being less than the second distortion).

For example, as shown in FIG. 4B, projected image 410-1 has a first aspect ratio and projected image 410-2 has a second aspect ratio that is distinct from the first aspect ratio. In addition, projected image 410-3 has a third aspect ratio that is distinct from the second aspect ratio. Thus, when eye 340 rotates from the first rotational position to the second rotational position, then to the third rotational position, following the movement of the object on display 402 from position 408-1 to position 408-2, then to position 408-3, the wearer will recognize that the distortion has changed, which reduces user experience with the display device. In addition, it is more challenging to correct distortions in projected images when the distortions change based on the position of the projected object.

Figure 5A:
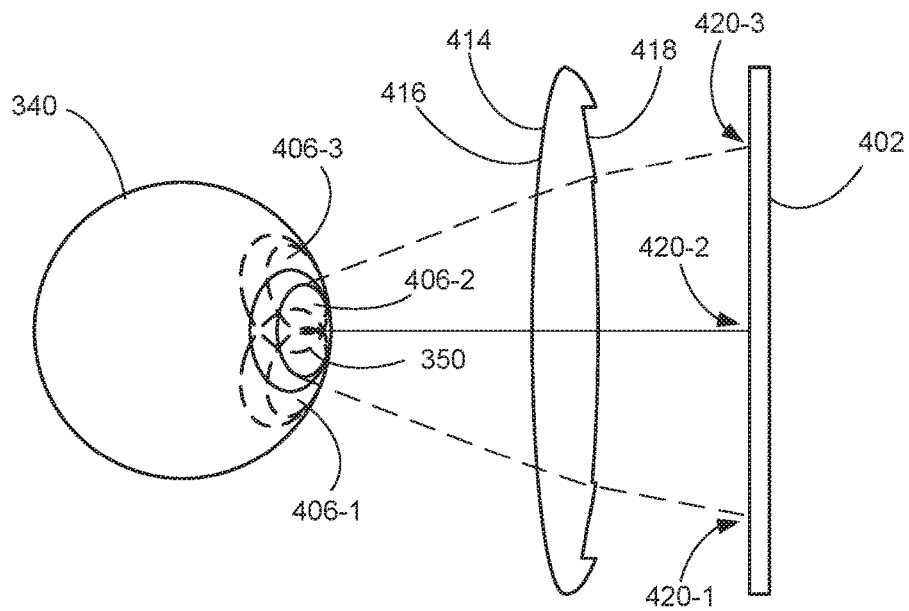
FIG. 5A is a schematic diagram illustrating a display device in accordance with some embodiments.

FIG. 5A is a schematic diagram illustrating a display device in accordance with some embodiments. FIG. 5A is similar to FIG. 4A except that lens 414 is used in place of lens 404. Lens 414 includes first surface 416 and second surface 418 that is opposite to first surface 416. In some embodiments, first surface 416 does not include Fresnel structures and second surface 418 includes Fresnel structures, as shown in FIG. 5A.

Lens 414 is configured so that light from first location 420-1 of display 402 is projected to pupil 350 of eye 340 in a first rotational position (e.g., pupil 350 is at location 406-1), light from second location 420-2 of display 402 is projected to pupil 350 of eye 340 in a second rotational position (e.g., pupil 350 is at location 406-2), and light from third location 420-3 of display 402 is projected to pupil 350 of eye 340 in a third rotational position (e.g., pupil 350 is at location 406-3). In addition, lens 414 is configured so that the light from first location 420-1 of display 402 to pupil 350 of eye 340 in the first rotational position (e.g., pupil 350 at location 406-1) has a same optical path length as the light from second location 420-2 of display 402 to pupil 350 of eye 340 in the second rotational position (e.g., pupil 350 at location 406-2) and the light from third location 420-3 of display 402 to pupil 350 of eye 340 in the third rotational position (e.g., pupil 350 at location 406-3). This allows lens 414 to have a consistent distortion profile regardless of the rotational position of eye 340, which is described further with respect to FIG. 5B. As used herein, an optical path length is a sum of segment optical path lengths for respective segments, and each segment optical path length is a product of a geometric path length for a respective segment and a refractive index of a medium for the respective segment. For example, the optical path length for the light from first location 420-1 of display 402 to pupil 350 of eye 340 in the first rotational position is a sum of (i) a geometric path length from first location 420-1 of display 402 to second surface 418 of lens 414 multiplied by a refractive index of the medium (e.g., air) between first location 420-1 of display 402 and second surface 418 of lens 414, (ii) a geometric path length from second surface 418 of lens 414 to first surface 416 of lens 414 along the path of the light multiplied by a refractive index of the medium of lens 414 (e.g., glass, polymethyl methacrylate, etc.), and (iii) a geometric path length from first surface 416 of lens 414 to pupil 350 of eye 340 in the first rotational position (e.g., pupil 350 at location 406-1) multiplied by a refractive index of the medium (e.g., air) between first surface 416 of lens 414 and pupil 350 of eye 340 in the first rotational position.

Figure 5B:
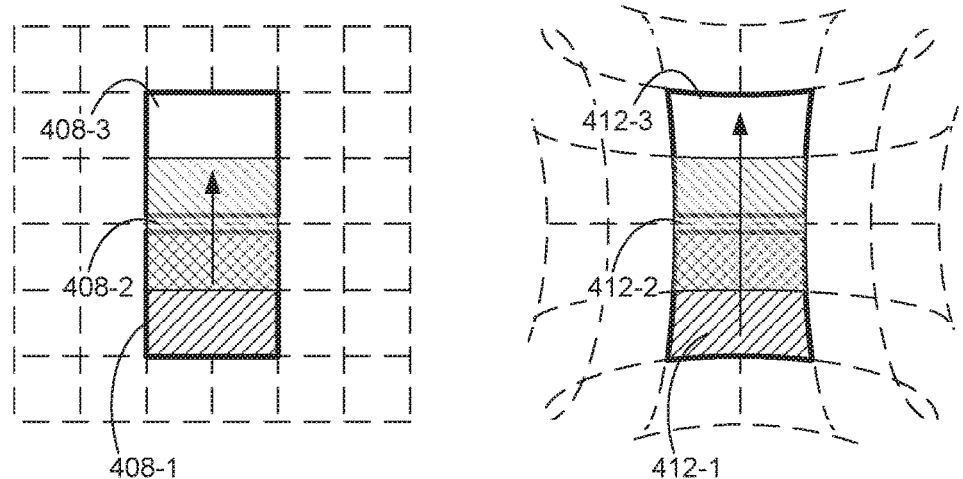
FIG. 5B illustrates displayed objects and projected objects in accordance with some embodiments.

FIG. 5B illustrates displayed objects and projected objects in accordance with some embodiments.

Similar to FIG. 4B (e.g., the left side of FIG. 4B), the left side of FIG. 5B illustrates an object moving on display 402 from position 408-1 to position 408-2, followed by a movement from position 408-2 to position 408-3.

The right side of FIG. 5B illustrates corresponding images of the object projected to eye 340. In FIG. 5B, the projected images show a pincushion distortion. Alternatively, the projected images may show a barrel distortion.

When eye 340 is receiving a projection of the object in position 408-1, the object is projected through a first portion of lens 414. The projection of the object through the first portion of lens 414 has a first distortion. When eye 340 is receiving a projection of the object in position 408-2, the object is projected through a second portion of lens 414, which is distinct from the first portion of lens 414. The projection of the object through the second portion of lens 414 has a second distortion that is consistent with the first distortion (e.g., the first distortion has a first degree of distortion and the second distortion has a second degree of distortion that is substantially similar to the first degree of distortion, such as the second degree of distortion being identical to the first degree of distortion). When eye 340 is receiving a projection of the object in position 408-3, the object is projected through a third portion of lens 414, which is distinct from the first portion and the second portion of lens 414. The projection of the object through the third portion of lens 414 has a third distortion that is consistent with the second distortion (e.g., the second distortion has a second degree of distortion and the third distortion has a third degree of distortion that is substantially similar to the second degree of distortion, such as the third degree of distortion being identical to the second degree of distortion).

Figure 6A:
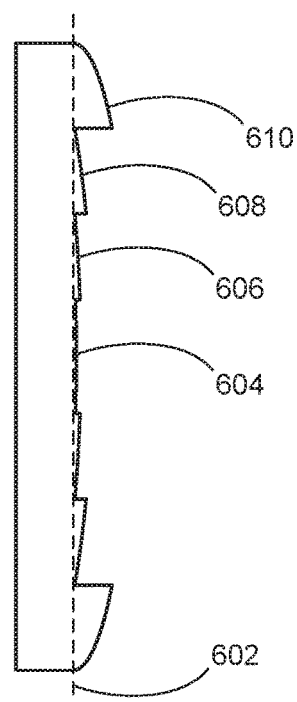
FIG. 6A is a schematic diagram illustrating a cross-section of a Fresnel lens in accordance with some embodiments.

FIG. 6A is a schematic diagram illustrating a cross-section of a Fresnel lens in accordance with some embodiments.

The lens shown in FIG. 6A has a plurality of Fresnel structures (e.g., a plurality of concentric sections, such as sections 604, 606, 608, and 610). In some embodiments, each Fresnel structure has a slope facet and a draft facet. In some embodiments, the slope facet is curved as shown in FIG. 6A. In some embodiments, the slope facet is straight (in a cross-sectional view, although the slope facet in three-dimension corresponds to a sloped facet of an annular prism). In some embodiments, the plurality of Fresnel structures has a constant pitch, as shown in FIG. 6A (e.g., each Fresnel structure has a same width). In some embodiments, the plurality of Fresnel structures has a constant depth (e.g., each Fresnel structure has a same height). In some embodiments, the plurality of Fresnel structures has a variable pitch and a variable depth (e.g., a width of a first Fresnel structure is distinct from a width of a second Fresnel structure and a height of the first Fresnel structure is distinct from a height of the second Fresnel structure).

In FIG. 6A, the plurality of Fresnel structures is aligned on flat (or straight) base line 602. When the lens shown in FIG. 6A is used, light from a first location of a display to a pupil of an eye of a wearer in a first rotational position typically does not have a same optical path length as light from a second location of the display to the pupil of the eye in the second rotational position.

Figure 6B:
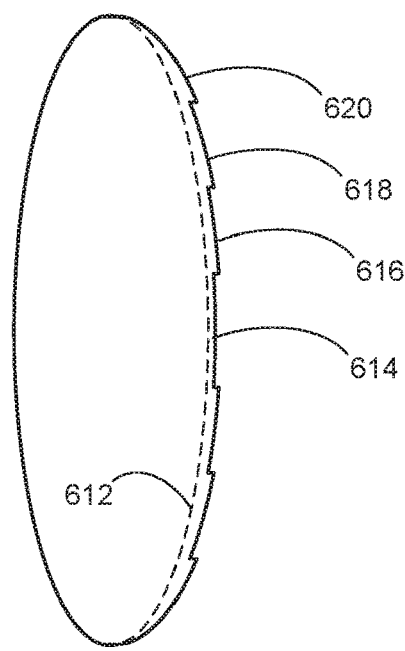
FIG. 6B is a schematic diagram illustrating a cross-section of a Fresnel lens in accordance with some embodiments.

FIG. 6B is a schematic diagram illustrating a cross-section of a Fresnel lens in accordance with some embodiments.

The lens shown in FIG. 6B has a plurality of Fresnel structures (e.g., a plurality of concentric sections, such as sections 614, 616, 618, and 620). In FIG. 6B, the plurality of Fresnel structures is aligned on curved base line 612. In some embodiments, curved base line 612 corresponds to a spherical surface. In some embodiments, curved base line 612 corresponds to a parabolic surface. When the lens shown in FIG. 6B is used, light from a first location of a display to a pupil of an eye of a wearer in a first rotational position typically has a same optical path length as light from a second location of the display to the pupil of the eye in the second rotational position. Thus, the lens shown in FIG. 6B allows providing a consistent distortion profile as shown in FIG. 5B, even when the rotational position of the eye changes.

Figure 7:
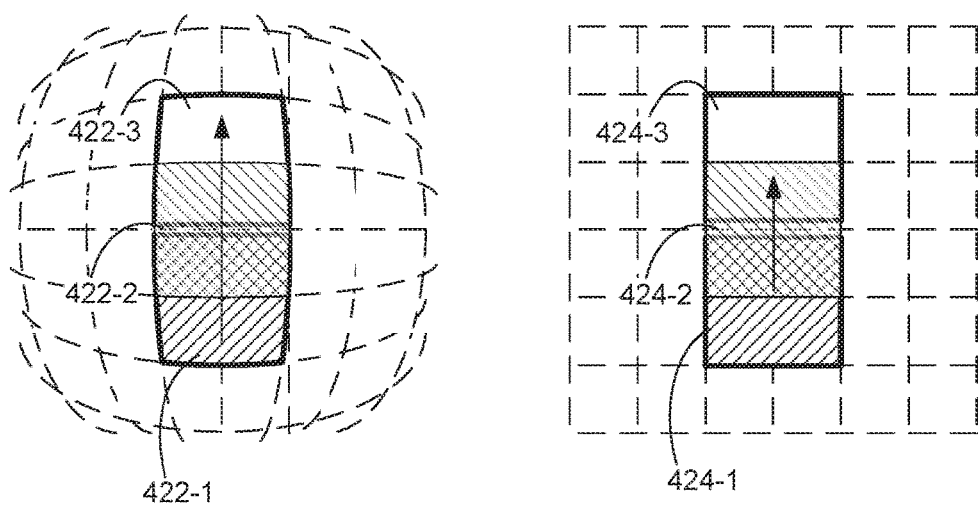
FIG. 7 illustrates displayed objects and projected objects in accordance with some embodiments.

FIG. 7 illustrates displayed objects and distortions in projected objects in accordance with some embodiments.

Once a consistent distortion profile is obtained by using the described lens (e.g., the lens described with respect to FIG. 6B), the distortion can be corrected by modifying an object image displayed on the display. For example, for projecting a rectangular image, instead of directly displaying the rectangular image, the display displays a modified image. As shown on the left side of FIG. 7, a barrel distorted image of a rectangular object at position 422-1 is displayed, followed by display of a barrel distorted image of a rectangular object at position 422-2 and subsequent display of a barrel distorted image of a rectangular object at position 422-3.

The barrel distorted images are projected by the lens associated with a pincushion distortion (e.g., FIG. 5B). The barrel distortion displayed on the display and the pincushion distortion associated with the lens compensate each other and a rectangular image with reduced (or no) distortion (shown on the right side of FIG. 7) is projected on the eye. Thus, the use of the described lens (e.g., the lens described with respect to FIG. 6B) facilitates reduction or elimination of the distortion.

If the distortion caused by the lens changes based on the position of the object (as shown in FIG. 4B), a single mapping function is not sufficient to correct for the distortion caused by the lens (e.g., the aspect ratio needs to be further adjusted based on the position of the object). Instead, a different mapping function is required based on a position of the display object. Thus, it is more challenging to correct distortions unless the lens can provide a consistent distortion profile as shown in FIG. 5B.

In light of these principles, we now turn to certain embodiments of a lens assembly.

In accordance with some embodiments, a head-mounted display device that includes a display (e.g., display 402 in FIG. 5A) and a lens (e.g., lens 414). The lens includes an optically transparent substrate (e.g., glass, polymethyl methacrylate, etc.) having a first lens surface (e.g., surface 416 in FIG. 5A) and a second lens surface (e.g., surface 418 in FIG. 5A) that is opposite to the first lens surface. The lens is separate from the display. The first lens surface includes a convex surface without Fresnel structures. The second lens surface is defined by a convex base curvature and a plurality of Fresnel structures (e.g., FIG. 6B). The lens is configured to focus light from a first location of the display on a pupil of an eye of a wearer in a first rotational position at a first time (e.g., lens 414 focuses light from location 420-1 of display 402 on pupil 350 of eye 340 in the first rotational position where pupil 350 is located at location 406-1, as shown in FIG. 5A) and focus light from a second location, distinct from the first location, of the display on the pupil of the eye of the wearer in a second rotational position that is distinct from the first rotational position at a second time that is distinct from the first time (e.g., lens 414 focuses light from location 420-2 of display 402 on pupil 350 of eye 340 in the second rotational position so that pupil 350 is located at location 406-2). The light from the first location of the display to the pupil of the eye of the wearer in the first rotational position and the light from the second location of the display to the pupil of the eye of the wearer in the second rotational position have a same optical path length.

In some embodiments, the lens is configured to focus light from a third location, distinct from the first location and the second location, of the display on the eye of the wearer in a third rotational position that is distinct from the first rotational position and the second rotational position at a third time that is distinct from the first time and the second time (e.g., lens 414 focuses light from location 420-3 of display 402 on pupil 350 of eye 340 in the third rotational position where pupil 350 is located at location 406-3, as shown in FIG. 5A). The light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

In some embodiments, the first rotational position corresponds to a first rotational elevation of the pupil of the eye of the wearer (e.g., the first rotational position corresponds to a first vertical position of the pupil of the eye of the wearer, such as looking down). The second rotational position corresponds to a second rotational elevation, distinct from the first rotational elevation, of the pupil of the eye of the wearer (e.g., the second rotational position corresponds to a second vertical position of the pupil of the eye of the wearer, such as looking straight ahead). The third rotational position corresponds to a third rotational elevation, distinct from the first rotational elevation and the second rotational elevation, of the pupil of the eye of the wearer (e.g., the third rotational position corresponds to a third vertical position of the pupil of the eye of the wearer, such as looking up).

In some embodiments, the convex surface of the first lens surface and the convex base curvature of the second lens surface cause the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position to have the same optical path length.

In some embodiments, the first lens surface is positioned away from the display; and the second lens surface is positioned toward the display. For example, as shown in FIG. 5A, the Fresnel structures on surface 418 are positioned toward display 402. In some embodiments, the first lens surface is positioned toward from the display; and the second lens surface is positioned away from the display.

In some embodiments, a respective Fresnel structure of the plurality of Fresnel structures includes a slope facet and a draft facet (e.g., FIG. 6B).

In some embodiments, the lens is sized to focus light from a first terminal location of the display on the pupil of the eye of the wearer in the first rotational position at the first time and focus light from a second terminal location, opposite from the first terminal location, of the display on the pupil of the eye of the wearer in the second rotational position that is distinct from the first rotational position at the second time that is distinct from the first time. For example, the lens is configured so that light from first and second edges of the display is projected on the pupil of the eye in respective rotational positions.

In some embodiments, the optical path length is determined based in part on a refractive index of the optically transparent substrate. As explained above with respect to FIG. 5A, an optical path length is a sum of segment optical path lengths for respective segments, and each segment optical path length is a product of a geometric path length for a respective segment and a refractive index of a medium for the respective segment.

In some embodiments, the device includes one or more processors configured to adjust an image displayed on the display using a particular mapping function. In some embodiments, the device includes one or more processors configured to adjust an image displayed on the display using a particular mapping function independent of whether the pupil of the eye of the wearer is in the first rotational position or the second rotational position. As explained above with respect to FIGS. 4B and 5B, the use of the lens shown in FIG. 5A or 6B provides a consistent distortion profile regardless of a position of an object on display 402. As shown in FIG. 7, a preselected barrel distortion function is used to adjust the image, which in turn reduces the distortion in the projected image.

In accordance with some embodiments, a lens includes an optically transparent substrate (e.g., glass, polymethyl methacrylate, etc.) having a first lens surface (e.g., surface 416 in FIG. 5A) and a second lens surface that is opposite to the first lens surface (e.g., surface 418 in FIG. 5A). The first lens surface includes a convex surface without Fresnel structures (e.g., FIG. 6B). The second lens surface is defined by a convex base curvature and a plurality of Fresnel structures (e.g., FIG. 6B). The lens is configured to focus light from a first location of a display that is separate from the lens on a pupil of an eye of a wearer in a first rotational position at a first time (e.g., lens 414 focuses light from location 420-1 of display 402 on pupil 350 of eye 340 in the first rotational position where pupil 350 is located at location 406-1, as shown in FIG. 5A) and focus light from a second location, distinct from the first location, of the display on the pupil of the eye of the wearer in a second rotational position that is distinct from the first rotational position at a second time that is distinct from the first time (e.g., lens 414 focuses light from location 420-2 of display 402 on pupil 350 of eye 340 in the second rotational position so that pupil 350 is located at location 406-2). The light from the first location of the display to the pupil of the eye of the wearer in the first rotational position and the light from the second location of the display to the pupil of the eye of the wearer in the second rotational position have a same optical path length.

In some embodiments, the lens is configured to focus light from a third location, distinct from the first location and the second location, of the display on the eye of the wearer in a third rotational position that is distinct from the first rotational position and the second rotational position at a third time that is distinct from the first time and the second time (e.g., lens 414 focuses light from location 420-3 of display 402 on pupil 350 of eye 340 in the third rotational position where pupil 350 is located at location 406-3, as shown in FIG. 5A). The light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

In some embodiments, the first rotational position corresponds to a first rotational elevation of the pupil of the eye of the wearer (e.g., the first rotational position corresponds to a first vertical position of the pupil of the eye of the wearer, such as looking down). The second rotational position corresponds to a second rotational elevation, distinct from the first rotational elevation, of the pupil of the eye of the wearer (e.g., the second rotational position corresponds to a second vertical position of the pupil of the eye of the wearer, such as looking straight ahead). The third rotational position corresponds to a third rotational elevation, distinct from the first rotational elevation and the second rotational elevation, of the pupil of the eye of the wearer (e.g., the third rotational position corresponds to a third vertical position of the pupil of the eye of the wearer, such as looking up).

In some embodiments, the convex surface of the first lens surface and the convex base curvature of the second lens surface are selected so that the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have a same optical path length.

In some embodiments, a respective Fresnel structure of the plurality of Fresnel structures includes a slope facet and a draft facet (e.g., FIG. 6B).

In accordance with some embodiments, a method includes focusing light from a first location of a display on a pupil of an eye of a wearer in a first rotational position at a first time with a lens that includes an optically transparent substrate having a first lens surface and a second lens surface that is opposite to the first lens surface (e.g., lens 414 focuses light from location 420-1 of display 402 on pupil 350 of eye 340 in the first rotational position where pupil 350 is located at location 406-1, as shown in FIG. 5A). The lens is separate from the display. The first lens surface includes a convex surface without Fresnel structures. The second lens surface is defined by a convex base curvature and a plurality of Fresnel structures. The method also includes focusing light from a second location, distinct from the first location, of the display on the pupil of the eye of the wearer in a second rotational position that is distinct from the first rotational position at a second time that is distinct from the first time with the lens (e.g., lens 414 focuses light from location 420-2 of display 402 on pupil 350 of eye 340 in the second rotational position so that pupil 350 is located at location 406-2). The light from the first location of the display to the pupil of the eye of the wearer in the first rotational position and the light from the second location of the display to the pupil of the eye of the wearer in the second rotational position have a same optical path length.

In some embodiments, the method also includes focusing light from a third location, distinct from the first location and the second location, of the display on the eye of the wearer in a third rotational position that is distinct from the first rotational position and the second rotational position at a third time that is distinct from the first time and the second time with the lens (e.g., lens 414 focuses light from location 420-3 of display 402 on pupil 350 of eye 340 in the third rotational position where pupil 350 is located at location 406-3, as shown in FIG. 5A). The light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

In some embodiments, the first rotational position corresponds to a first rotational elevation of the pupil of the eye of the wearer (e.g., the first rotational position corresponds to a first vertical position of the pupil of the eye of the wearer, such as looking down). The second rotational position corresponds to a second rotational elevation, distinct from the first rotational elevation, of the pupil of the eye of the wearer (e.g., the second rotational position corresponds to a second vertical position of the pupil of the eye of the wearer, such as looking straight ahead). The third rotational position corresponds to a third rotational elevation, distinct from the first rotational elevation and the second rotational elevation, of the pupil of the eye of the wearer (e.g., the third rotational position corresponds to a third vertical position of the pupil of the eye of the wearer, such as looking up).

In some embodiments, the convex surface of the first lens surface and the convex base curvature of the second lens surface cause the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

In some embodiments, the method includes focusing light from a first terminal location of the display on the pupil of the eye of the wearer in the first rotational position at the first time; and focusing light from a second terminal location, opposite from the first terminal location, of the display on the pupil of the eye of the wearer in the second rotational position that is distinct from the first rotational position at the second time that is distinct from the first time. For example, the lens is sized so that light from first and second edges of the display is projected on the pupil of the eye in respective rotational positions (e.g., the lens is big enough to focus light from the first terminal location onto the pupil of the eye in the first rotational position and focus light from the second terminal location onto the pupil of the eye in the second rotational position).

In some embodiments, the method also includes adjusting an image displayed on the display using a particular mapping function. In some embodiments, the method also includes adjusting an image displayed on the display using a particular mapping function independent of whether the pupil of the eye of the wearer is in the first rotational position or the second rotational position. As shown in FIG. 7, a preselected barrel distortion function is used to adjust the image, which in turn reduces the distortion in the projected image. In some embodiments, adjusting the image displayed on the display includes displaying an image that is mapped using the particular mapping function.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A head-mounted display device, comprising:
   a display; and
   a lens separate from the display, the lens having an optically transparent substrate, wherein:
   the lens is configured to focus light from a first location of the display on a pupil of an eye of a wearer in a first rotational position and focus light from a second location, distinct from the first location, of the display on the pupil of the eye of the wearer in a second rotational position that is distinct from the first rotational position;

the first location of the display is located at a first distance from an optical axis of the lens and the second location of the display is located at a second distance, distinct from the first distance, from the optical axis of the lens;

the light from the first location of the display to the pupil of the eye of the wearer in the first rotational position and the light from the second location of the display to the pupil of the eye of the wearer in the second rotational position have a same optical path length; and the optical path length is determined based in part on a refractive index of the optically transparent substrate.

2. The head-mounted display device of claim 1, wherein:
the optically transparent substrate includes a first convex surface and a second convex surface that is opposite to the first convex surface.

3. The head-mounted display device of claim 2, wherein:
the first convex surface and the second convex surface cause the light from the first location of the display to the pupil of the eye of the wearer in the first rotational position and the light from the second location of the display to the pupil of the eye of the wearer in the second rotational position to have the same optical path length.

4. The head-mounted display device of claim 1, wherein:
the lens is configured to focus light from a third location, distinct from the first location and the second location, of the display on the eye of the wearer in a third rotational position that is distinct from the first rotational position and the second rotational position;

the third location of the display is located at a third distance, distinct from the first distance and the second distance, from the optical axis of the lens; and the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

5. The head-mounted display device of claim 4, wherein:
the first rotational position corresponds to a first vertical position of the pupil of the eye of the wearer;

the second rotational position corresponds to a second vertical position, distinct from the first vertical position, of the pupil of the eye of the wearer; and the third rotational position corresponds to a third vertical position, distinct from the first vertical position and the second vertical position, of the pupil of the eye of the wearer.

6. The head-mounted display device of claim 5, wherein:
the first vertical position corresponds to a position where the wearer is looking down;

the second vertical position corresponds to a position where the wearer is looking straight ahead; and the third vertical position corresponds to a position where the wearer is looking up.

7. The head-mounted display device of claim 1, wherein:
the lens is sized to focus light from a first edge location of the display on the pupil of the eye of the wearer in the first rotational position and focus light from a second edge location, opposite from the first edge location, of the display on the pupil of the eye of the wearer in the second rotational position that is distinct from the first rotational position.

8. The head-mounted display device of claim 7, wherein:
an object projected by a first portion of the display through a first portion of the lens to the pupil of the eye of the wearer in the first rotational position has a first distortion, and the object projected by a second portion distinct from the first portion of the display through a second portion distinct from the first portion of the lens to the pupil of the eye of the wearer in the second rotational position has a second distortion that is consistent with the first distortion.

9. A lens, comprising:
an optically transparent substrate, wherein:
the lens is configured to focus light from a first location of a display on a pupil of an eye of a wearer in a first rotational position and focus light from a second location, distinct from the first location, of the display on the pupil of the eye of the wearer in a second rotational position that is distinct from the first rotational position;

the first location of the display is located at a first distance from an optical axis of the lens and the second location of the display is located at a second distance, distinct from the first distance, from the optical axis of the lens;

the light from the first location of the display to the pupil of the eye of the wearer in the first rotational position and the light from the second location of the display to the pupil of the eye of the wearer in the second rotational position have a same optical path length; and the optical path length is determined based in part on a refractive index of the optically transparent substrate.

10. The lens of claim 9, wherein:
The optically transparent substrate includes a first convex surface and a second convex surface that is opposite to the first convex surface.

11. The lens of claim 10, wherein:
the first convex surface and the second convex surface cause the light from the first location of the display to the pupil of the eye of the wearer in the first rotational position and the light from the second location of the display to the pupil of the eye of the wearer in the second rotational position to have the same optical path length.

12. The lens of claim 9, wherein:
the lens is configured to focus light from a third location, distinct from the first location and the second location, of the display on the eye of the wearer in a third rotational position that is distinct from the first rotational position and the second rotational position;

the third location of the display is located at a third distance, distinct from the first distance and the second distance, from the optical axis of the lens; and the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

13. The lens of claim 12, wherein:
the first rotational position corresponds to a first vertical position of the pupil of the eye of the wearer;

the second rotational position corresponds to a second vertical position, distinct from the first vertical position, of the pupil of the eye of the wearer; and the third rotational position corresponds to a third vertical position, distinct from the first vertical position and the second vertical position, of the pupil of the eye of the wearer.

14. The lens of claim 13, wherein:

the first vertical position corresponds to a position where the wearer is looking down;

the second vertical position corresponds to a position where the wearer is looking straight ahead; and the third vertical position corresponds to a position where the wearer is looking up.

15. The lens of claim 9, wherein:

the lens is sized to focus light from a first edge location of the display on the pupil of the eye of the wearer in the first rotational position and focus light from a second edge location, opposite from the first edge location, of the display on the pupil of the eye of the wearer in the second rotational position that is distinct from the first rotational position.

16. The lens of claim 15, wherein:

an object projected by a first portion of the display through a first portion of the lens to the pupil of the eye of the wearer in the first rotational position has a first distortion, and the object projected by a second portion distinct from the first portion of the display through a second portion distinct from the first portion of the lens to the pupil of the eye of the wearer in the second rotational position has a second distortion that is consistent with the first distortion.

17. A method, comprising:

focusing, with a lens, light from a first location of a display on a pupil of an eye of a wearer in a first rotational position, the lens being separate from the display and includes an optically transparent substrate; and focusing, with the lens, light from a second location, distinct from the first location, of the display on the pupil of the eye of the wearer in a second rotational position that is distinct from the first rotational position, wherein:

the first location of the display is located at a first distance from an optical axis of the lens and the second location of the display is located at a second distance, distinct from the first distance, from the optical axis of the lens;

the light from the first location of the display to the pupil of the eye of the wearer in the first rotational position and the light from the second location of the display to the pupil of the eye of the wearer in the second rotational position have a same optical path length; and the optical path length is determined based in part on a refractive index of the optically transparent substrate.

18. The method of claim 17, wherein:

The optically transparent substrate includes a first convex surface and a second convex surface that is opposite to the first convex surface.

19. The method of claim 18, wherein:

the first convex surface and the second convex surface cause the light from the first location of the display to the pupil of the eye of the wearer in the first rotational position and the light from the second location of the display to the pupil of the eye of the wearer in the second rotational position to have the same optical path length.

20. The method of claim 17, further including:

focusing, with the lens, light from a third location distinct from the first location and the second location, of the display on the eye of the wearer in a third rotational position that is distinct from the first rotational position and the second rotational position, wherein:

the third location of the display is located at a third distance, distinct from the first distance and the second distance, from the optical axis of the lens; and the light from the first location of the display to the pupil of the eye of the wearer in the first rotational position, the light from the second location of the display to the pupil of the eye of the wearer in the second rotational position, and the light from the third location of the display to the pupil of the eye of the wearer in the third rotational position have the same optical path length.

* * * * *